US011051297B2

(12) United States Patent
Patil et al.

(10) Patent No.: US 11,051,297 B2
(45) Date of Patent: Jun. 29, 2021

(54) SPATIAL REUSE AND TRANSMIT OPPORTUNITY DURATION REPRESENTATION

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US); Raja Banerjea, San Jose, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 15/636,178

(22) Filed: Jun. 28, 2017

(65) Prior Publication Data
US 2018/0007689 A1 Jan. 4, 2018

Related U.S. Application Data

(60) Provisional application No. 62/356,804, filed on Jun. 30, 2016.

(51) Int. Cl.
*H04W 72/04* (2009.01)
*H04W 74/08* (2009.01)
*H04L 29/06* (2006.01)
*H04W 84/12* (2009.01)

(52) U.S. Cl.
CPC ......... *H04W 72/0446* (2013.01); *H04L 69/22* (2013.01); *H04W 72/046* (2013.01); *H04W 74/0808* (2013.01); *H04W 84/12* (2013.01)

(58) Field of Classification Search
CPC ..... H04W 28/10; H04W 28/16; H04W 28/18; H04W 72/04; H04W 72/046; H04W 72/0406; H04W 72/0446; H04W 72/1236; H04W 74/002; H04W 74/006; H04W 74/0808; H04W 74/0816; H04W 84/12; H04L 69/22
See application file for complete search history.

(56) References Cited

U.S. PATENT DOCUMENTS 9,408,230 B2 * 8/2016 Zhu et al.
2014/0328269 A1 * 11/2014 Zhu et al.
2016/0233940 A1 * 8/2016 Huang et al.

OTHER PUBLICATIONS

Ron Porat (BROADCOM): "SIGA fields and Bitwidths; 11-15-1354-02-00ax-siga-fields-and-bitwidt hs", IEEE Draft; 11-15-1354-02-00AX-SIGA-FIELDS-AND-BITWIDTHS, IEEE-SA Mentor, Piscataway, NJ USA, vol. 802. Ilax, No. 2, Mar. 14, 2016 (Mar. 14, 2016), pp. 1-19, XP068104702, [retrieved on Mar. 14, 2016].*
International Search Report and Written Opinion—PCT/US2017/039985—ISA/EPO—dated Sep. 29, 2017.
(Continued)

*Primary Examiner* — Marsha D Banks Harold
*Assistant Examiner* — Dharmesh J Patel
(74) *Attorney, Agent, or Firm* — Patterson & Sheridan, LLP (57) ABSTRACT

Certain aspects of the present disclosure relate to providing a mechanism that may be used to flexibly and efficiently signal spatial reuse (SR) and/or transmit opportunity (TXOP) duration information.

19 Claims, 9 Drawing Sheets

(56) References Cited

OTHER PUBLICATIONS

Porat R., et al., (BROADCOM):"SIG-A Fields and Bitwidths; 11-15-1354-02-00ax-siga-fields-and-bitwidths", IEEE Draft; IEEE-SA Mentor, Piscataway, NJ USA, vol. 802.11ax, No. 2, Mar. 14, 2016, XP068104702, pp. 1-19. [retrieved on Mar. 14, 2016].

Zhang J., et al., (Huawei): "HE-SIG-A Content; 11-15-1077-00-00ax-he-sig-a-content", IEEE Draft, IEEE-SA Mentor, Piscataway, NJ USA, vol. 802.11 ax, Sep. 14, 2015, XP068098290, pp. 1-21. [retrieved on Sep. 14, 2015].

* cited by examiner

SR = 0: (At least some) Bits Carry TXOP Duration Information
SR = 1: (At least some) Bits Carry SR Information

SPATIAL REUSE AND TRANSMIT OPPORTUNITY DURATION REPRESENTATION

CLAIM OF PRIORITY UNDER 35 U.S.C. § 119

The present Application for Patent claims benefit of U.S. Provisional Patent Application Ser. No. 62/356,804, filed Jun. 30, 2016, assigned to the assignee hereof and hereby expressly incorporated by reference herein.

BACKGROUND

Field of the Disclosure

Certain aspects of the present disclosure generally relate to wireless communications and, more particularly, to signaling spatial reuse (SR) and/or transmit opportunity (TXOP) duration information in wireless communications systems using spatial reuse (SR).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide an apparatus for wireless communications. The apparatus generally includes a processing system configured to generate a frame with a header comprising at least a first field carrying spatial reuse (SR) information and transmit opportunity (TXOP) duration information, and an interface configured to output the frame for transmission.

Certain aspects of the present disclosure provide an apparatus for wireless communications. The apparatus generally includes an interface configured to obtain a first frame with a header comprising at least a first field carrying spatial reuse (SR) information and transmit opportunity (TXOP) duration information, and a processing system configured to process the SR information and TXOP duration information of the first field.

Certain aspects of the present disclosure provide various other apparatuses, methods, and computer readable medium corresponding to the functionality described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to specifying possible default spatial reuse (SR) modes and signaling of the default SR modes. As will be described in more detail herein, a station (STA) that sends an overlapping basic service set (OBSS) frame may determine that the STA prefers that other STAs perform SR over the OBSS frame according to a default SR mode instead of performing SR based on a clear channel assessment (CCA) level or interference level indicated in an SR information field in the OBSS frame.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

Figure 1:
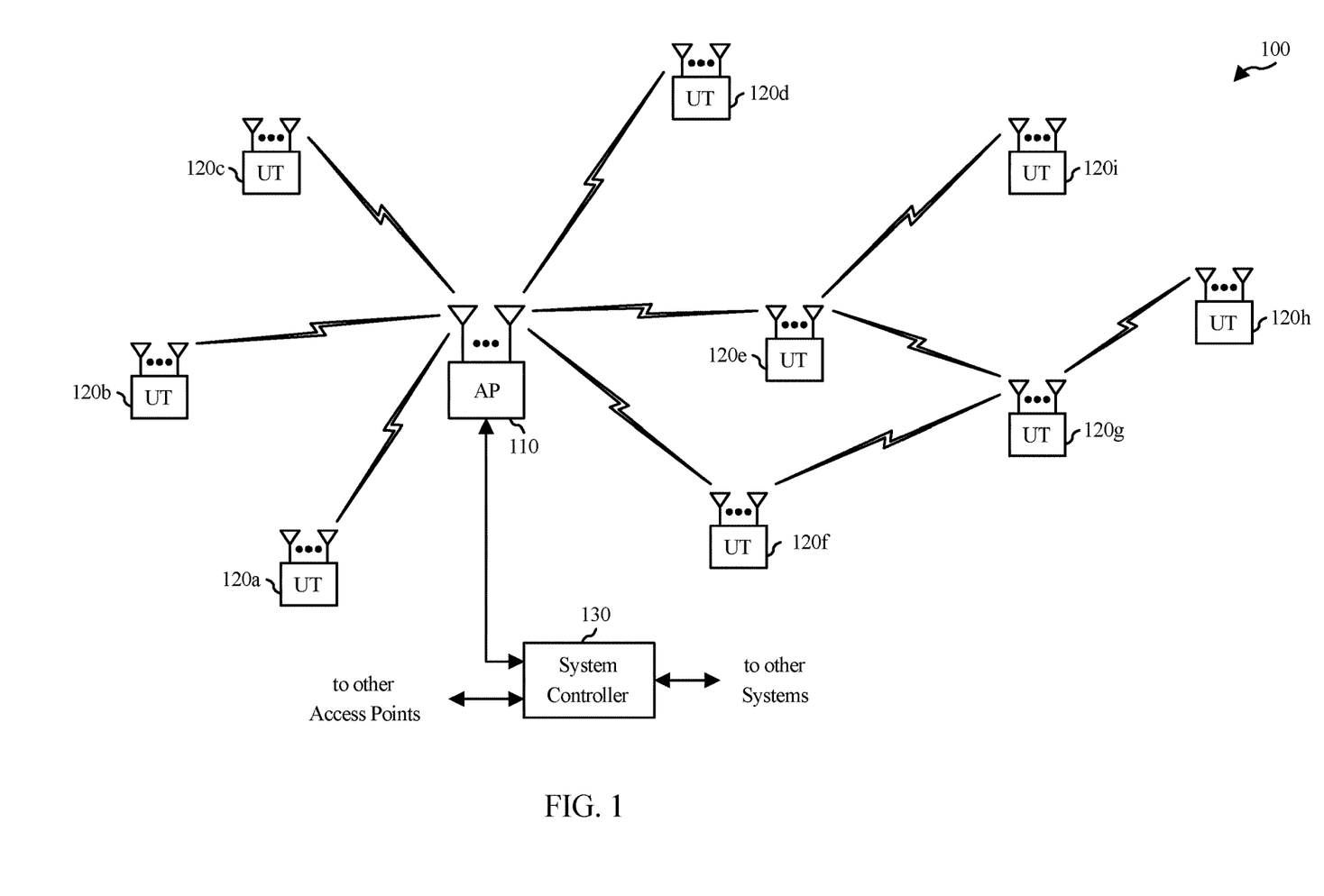
FIG. 1 illustrates an example wireless communications network, in accordance with certain aspects of the present disclosure.

FIG. 1 illustrates a system 100 in which aspects of the disclosure may be performed. For example, the user terminal 120e may send access point 110 may send an OBSS frame (e.g., a physical layer convergence protocol (PLCP) protocol data unit (PPDU)) to AP 110 having an indication that other STAs should perform SR according to a default mode instead of performing SR according a CCA level or interference level included in an SR information field of the OBSS frame. Recipient user terminals 120 (e.g., UT 120g) may determine, based on the indication, to perform SR according to the indicated default mode and may begin generating and transmitting a frame to other recipients (e.g., UT 120h) before the UT 120e completes transmitting of the OBSS frame.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
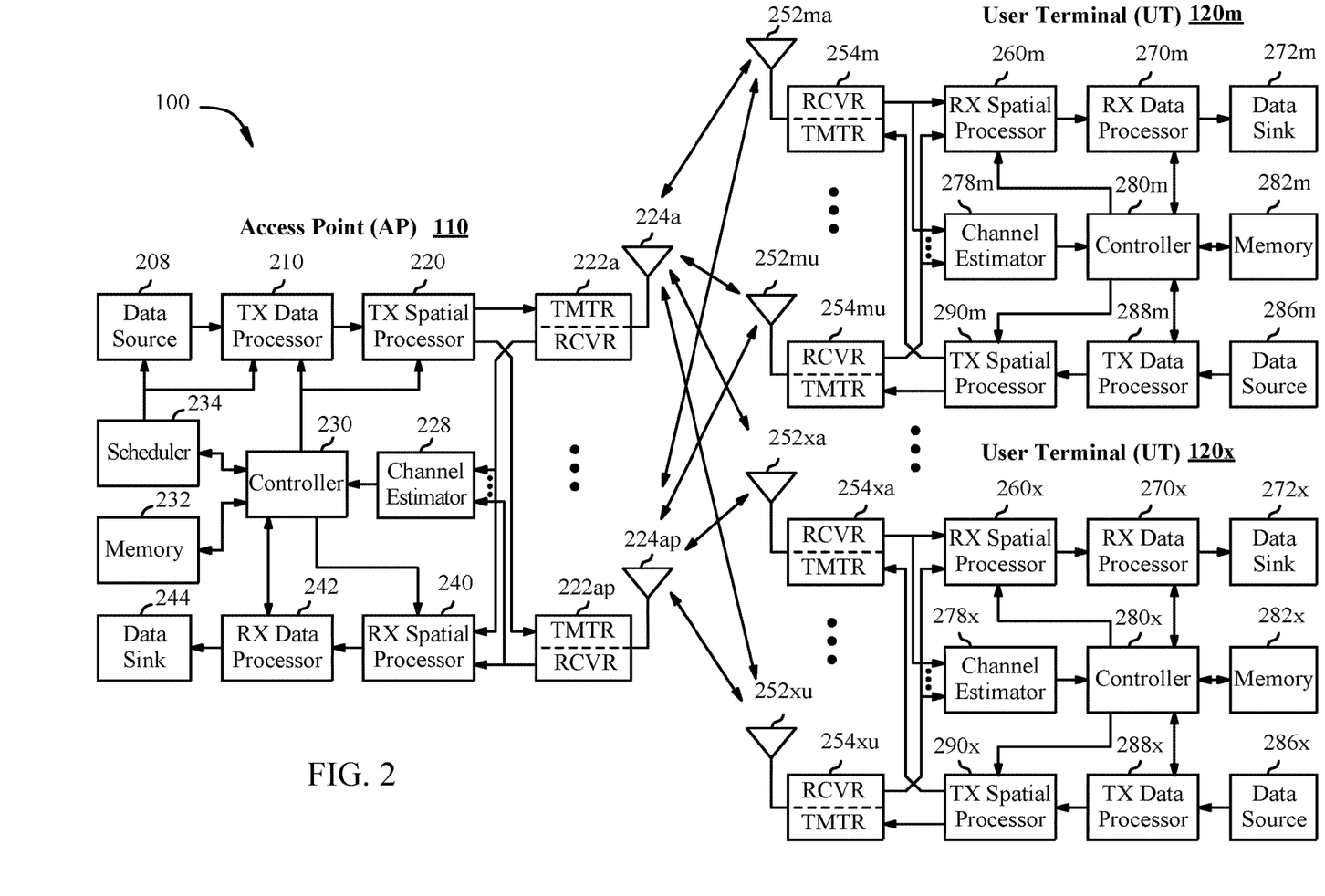
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 6 and 6A. Similarly, antenna 252, Tx/Rx 254, processors 260, 270, 288, and 290, and/or controller 280 may be used to perform the operations described herein and illustrated with reference to FIGS. 7 and 7A.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceiver 254 receives and processes (e.g., converts to analog, amplifies, filters, and frequency upconverts) a respective transmit symbol stream to generate an uplink signal. $N_{ut,m}$ transmitter units of transceivers 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) of a transceiver 222. Each receiver unit of a transceiver 222 performs processing complementary to that performed by transmitter unit of transceiver 254 and provides a received symbol stream. An RX spatial processor 240 performs receiver spatial processing on the $N_{ap}$ received symbol streams from $N_{ap}$ receiver units of transceivers 222 and provides $N_{ap}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a pre-coding or beamforming, as described in the present disclosure) on the $N_{dn}$ downlink data symbol streams, and provides $N_{ap}$ transmit symbol streams for the $N_{ap}$ antennas. Each transmitter unit of transceivers 222 receives and processes a respective transmit symbol stream to generate a downlink signal. $N_{ap}$ transmitter units of transceivers 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit of transceivers 254 processes a received signal from an associated antenna 252 and provides a received symbol stream. An RX spatial processor 260 performs receiver spatial processing on $N_{ut,m}$ received symbol streams from $N_{ut,m}$ receiver units of transceivers 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
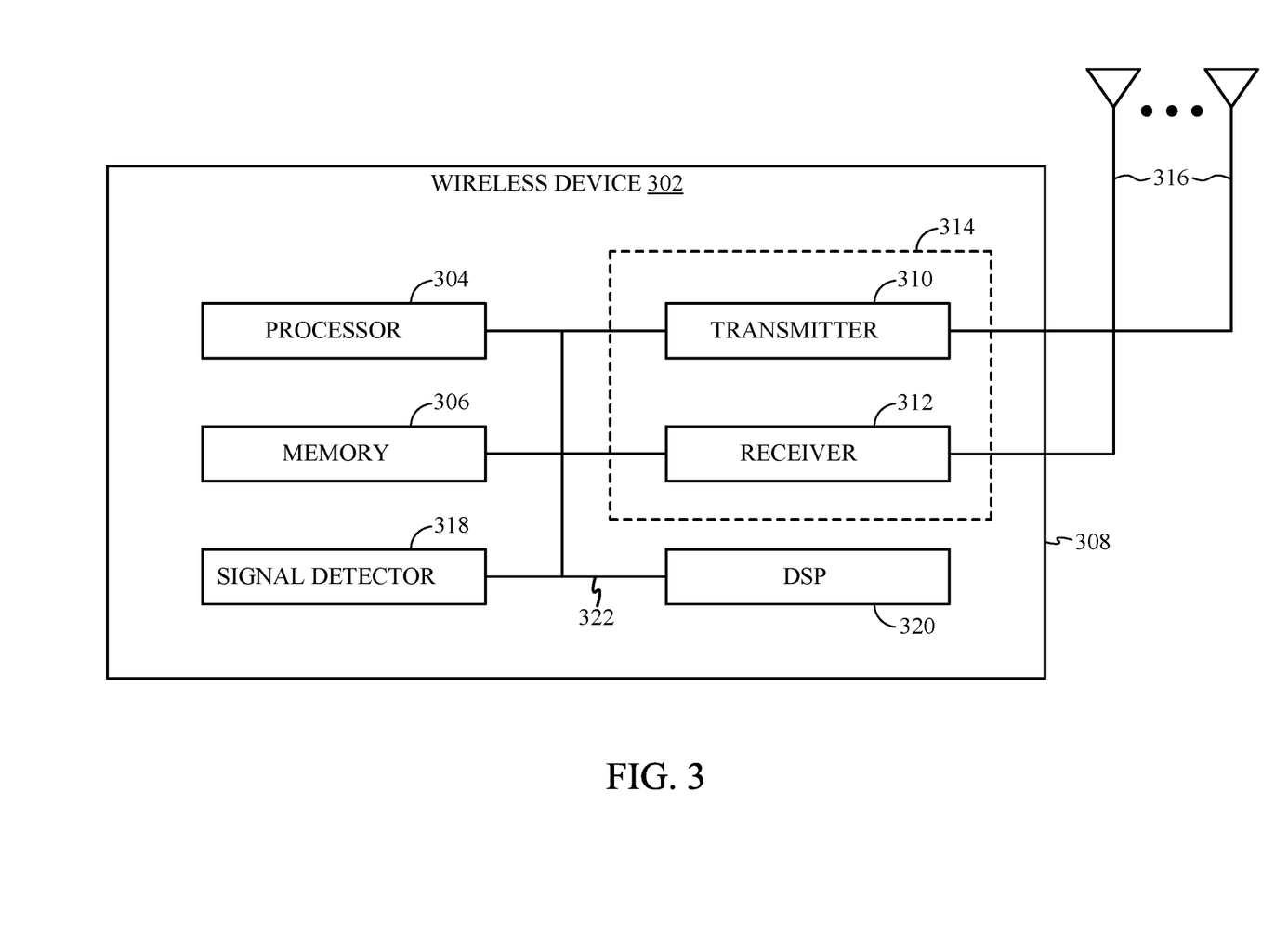
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 1000 and 1100 illustrated in FIGS. 10 and 11, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Spatial Reuse

Spatial reuse (SR) in IEEE 802.11 wireless communications refers to a station (STA) transmitting on a channel despite detecting that another STA is already transmitting on that channel. The STA may receive a portion of a frame, determine that the STA is allowed to transmit while the frame is being transmitted, and begin transmitting another frame.

According to aspects of the present disclosure, a STA may begin receiving an overlapping basic service set (OBSS) packet layer convergence protocol (PLCP) protocol data unit (PDU) (e.g., a frame) that is not intended for the STA, determine that the OBSS PPDU indicates that the STA may transmit on the channel while the OBSS PPDU is still being transmitted, and the STA begins transmitting (e.g., a PPDU) on the channel before the OBSS PPDU is complete. A STA operating according to the IEEE 802.11ax standard may regard a valid OBSS PPDU as not having been received at all (e.g., the STA does not consider the channel busy), except for the time required by the STA to validate that the PPDU is from an Inter-BSS, if the received power (RXPWR) of the OBSS PPDU is below an OBSS packet detection (OBSS_PD) threshold and other conditions are met.

Figure 4:
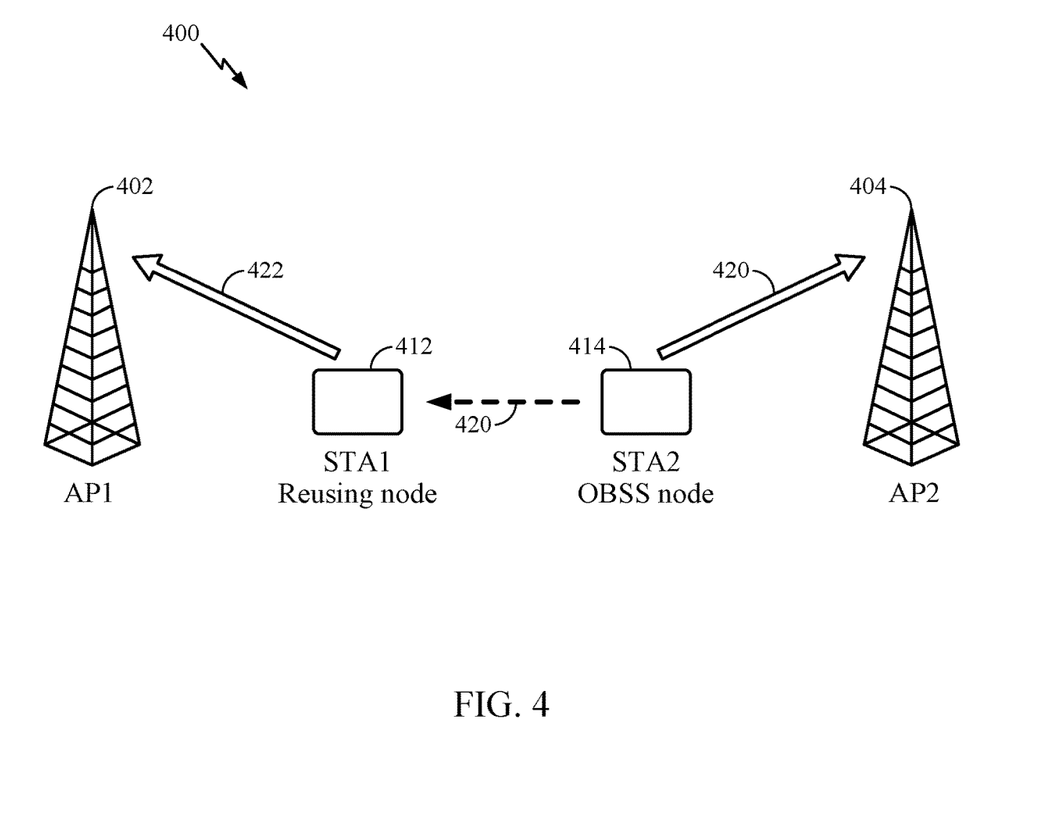
FIG. 4 illustrates an exemplary wireless communications network in which aspects of the present disclosure may be practiced.

FIG. 4 illustrates an exemplary wireless communications network 400 in which aspects of the present disclosure may be practiced. The exemplary wireless communications network includes a first AP 402, a first STA 412, a second STA 414, and a second AP 404. In the exemplary wireless communications network, the second STA is an OBSS node. At time T, the second STA begins transmitting an OBSS PPDU 420 to the second AP. The first STA begins receiving the OBSS PPDU at time T. Shortly after time T, the first STA determines that the OBSS PPDU is not intended for the first STA and that the OBSS PPDU indicates that stations receiving may perform spatial reuse. The first STA then begins performing spatial reuse by transmitting a PPDU 422 to the first AP while the second STA is still transmitting the OBSS PPDU.

When receiving an OBSS frame (e.g., an OBSS PPDU), a STA may decide whether to perform SR by checking SR information that may be included in the OBSS frame. The SR information may comprise, for example, indications of a CCA level or an interference level selected by a node that transmitted the OBSS frame. If an interference level is indicated, then the STA may perform spatial reuse over the OBSS frame, if interference to an OBSS link caused by the STA transmitting is below the indicated interference level. If a CCA level is indicated, then the STA may perform spatial reuse over the OBSS frame if the OBSS frame's RSSI, as measured by the STA, is below the indicated CCA level. Here, the interference and CCA levels also include other variants, which are still based on caused interference or measured RSSI. More generally, a STA may obtain (e.g., receive) a frame (e.g., an OBSS frame), determine an indication of a CCA level and/or an interference level from the frame, and determine whether to perform SR over the frame based on the indication(s) and at least one of interference potentially caused by performing SR and/or the RSSI of the frame.

SR information may include SR parameters that may be carried in an SR field of a signal (SIG) field (e.g., a SIG-A field) in a frame preamble. Because of a need for a frame preamble length to be fixed (e.g., to enable stations to properly interpret the frame preamble), the format of the SR field is likely to be fixed to prevent dynamic changes to preamble lengths in a network.

Figure 5:
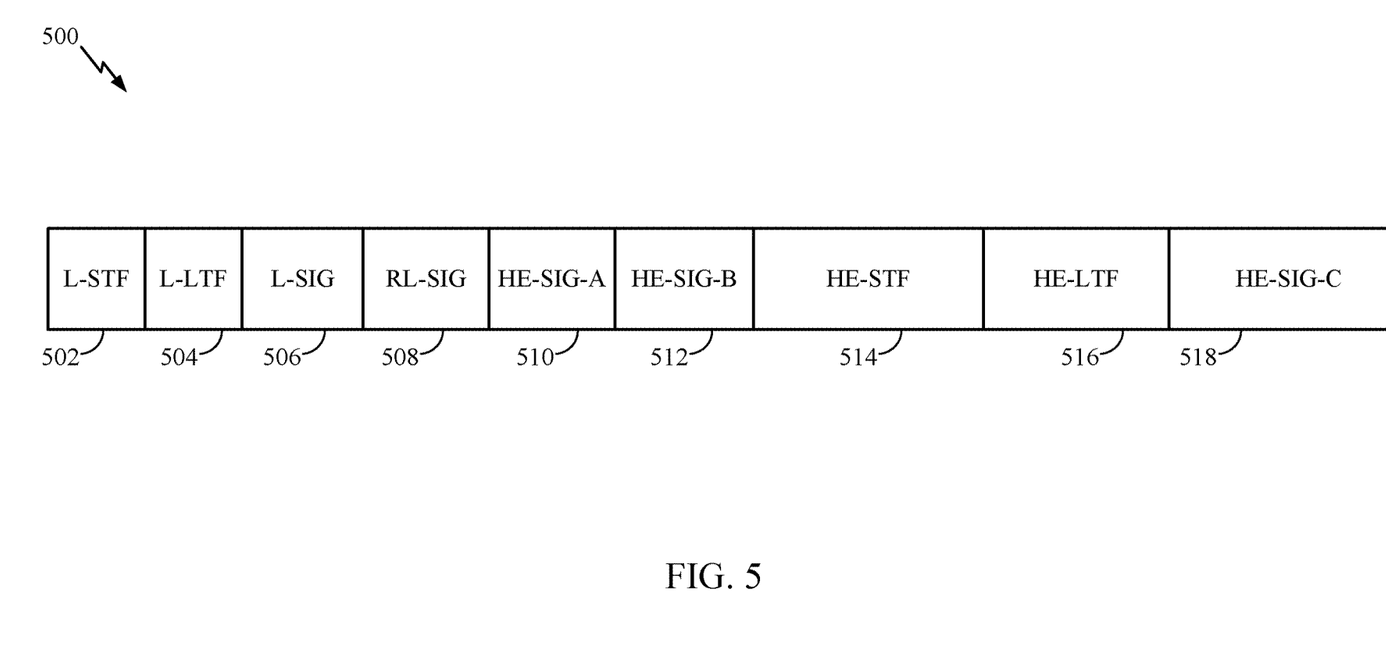
FIG. 5 illustrates example fields of a frame preamble, in accordance with certain aspects of the present disclosure.

FIG. 5 illustrates example fields of a frame preamble (e.g., a PHY header) 500 that may be included in an OBSS frame that may carry SR information (e.g., in an SR field), in accordance with certain aspects of the present disclosure. According to aspects of the present disclosure, a preamble of an OBSS frame may include a legacy short training field (L-STF) 502, a legacy long training field (L-LTF) 504, a legacy signal field (L-SIG) 506, a repeated L-SIG field (RL-SIG) 508, a high efficiency signal field A (HE-SIG-A) 510, a high efficiency signal field B (HE-SIG-B) 512, a high efficiency short training field (HE-STF) 514, a high efficiency long training field (HE-LTF) 516, and a high efficiency signal field C (HE-SIG-C) 518. SR information may be carried in one of the signal fields. As an example, the HE-SIG-A field 510 may carry SR information in an SR field of the HE-SIG-A field.

As noted above, the HE Signal A (HE-SIG-A) field present in the PHY header of an HE PPDU frame may carry various types of information (e.g., UL/DL, BSS Color, SR, TXOP, etc.). In current standards, the Spatial Reuse (SR) and TXOP_Duration field size and exact use is unspecified. Aspects of the present disclosure provide various options for efficiently utilizing these fields.

Example Spatial Reuse and TXOP Duration Representation

According to certain aspects, both SR and TXOP Duration information may be provided in a frame header-allowing early detection of this information and allowing appropriate action to be taken without having to decode the entire frame. This information may be provided in separate fields or, in some cases, a single field (or sub-field) may be "overloaded" to carry either Spatial Reuse or TXOP Duration information (or some form of both).

Figure 6:
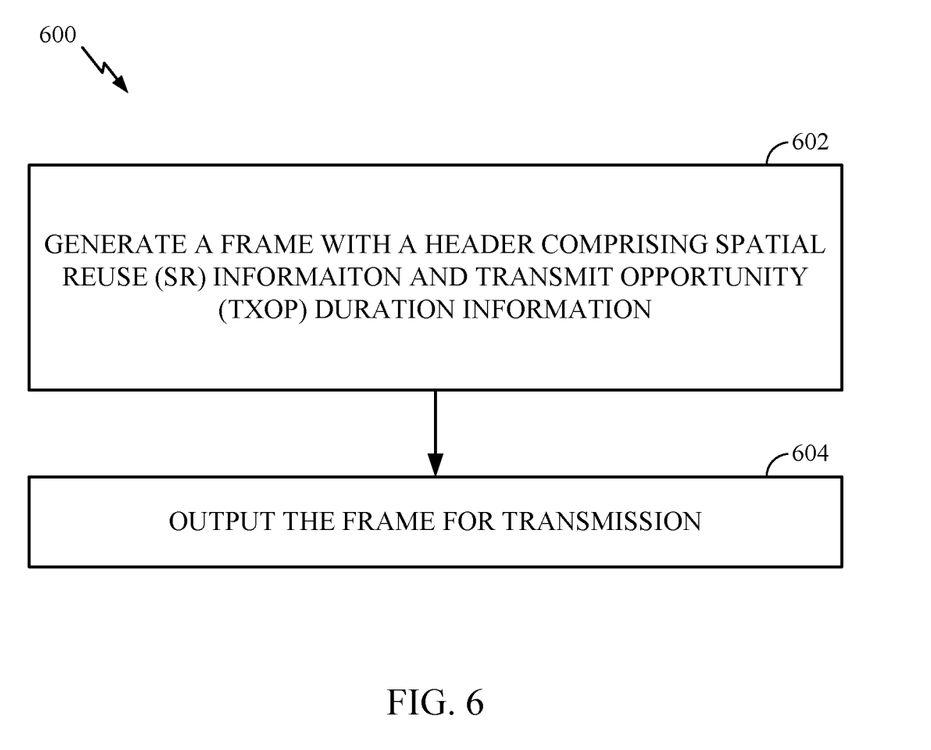
FIG. 6 illustrates example operations for wireless communications by a transmitting device, in accordance with certain aspects of the present disclosure.

FIG. 6 illustrates example operations 600 that may be performed by a transmitting device (e.g., an AP) to efficiently signal SR and/or TXOP information.

Operations 600 begin, at 602, by generating a frame with a header comprising spatial reuse (SR) information and transmit opportunity (TXOP) duration information. At block 604, the frame is output for transmission.

Figure 7:
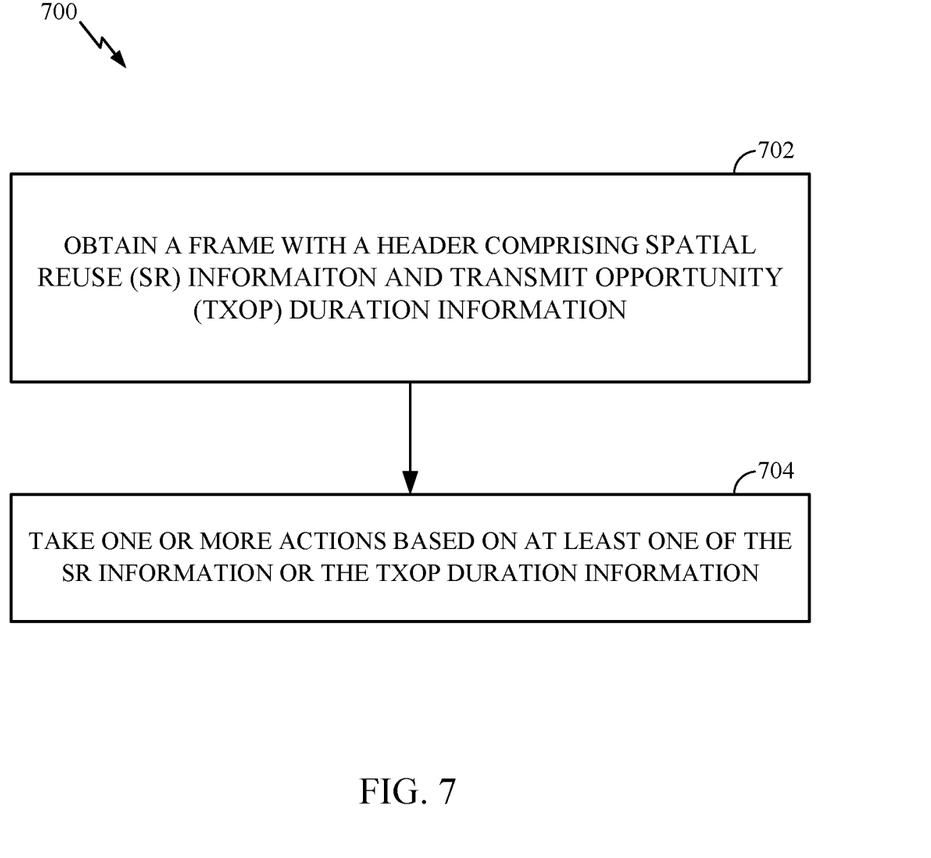
FIG. 7 illustrates example operations for wireless communications by a receiving device, in accordance with certain aspects of the present disclosure.

FIG. 7 illustrates example operations 700 that may be performed by a receiving device (e.g., a STA), according to aspects of the present disclosure. Operations 700 may be considered complementary to operations 600, shown in FIG. 6, in that they may be performed by a node receiving a frame transmitted in accordance with operations 600.

Operations 700 begin, at 702, by obtaining a first frame with a header comprising at least a first field carrying spatial reuse (SR) information and transmit opportunity (TXOP) duration information. At 704, the receiver takes action based on at least one of the SR information or the TXOP duration information. For example, based on the SR information, the receiver may determine it is not an intended recipient (e.g., if the SR information indicates the frame is from an OBSS) and take action (e.g., avoiding transmission on the medium). The receiver may also stop processing the packet and stay off the medium for a duration indicated by the TXOP duration information.

As described above (e.g., with reference to FIG. 4), even when a STA determines a frame is an OBSS transmission, the SR information may help the STA decide whether it can transmit on top of (during the TXOP of) the on-going OBSS transmission. For example, the SR information may include an indication of if spatial reuse (SR) is permitted or not and, if permitted, under what conditions (e.g., based on signal strength of the OBSS Tx as perceived by the receiver and/or other factors). A receiver may then transmit during a TXOP duration only after deciding it is permitted to (e.g., if the SR information indicates SR is permitted and indicated conditions are met).

In some cases, at least one bit may be provided that indicates how to process the at least one of SR information or TXOP duration information of the first field.

Figure 8:
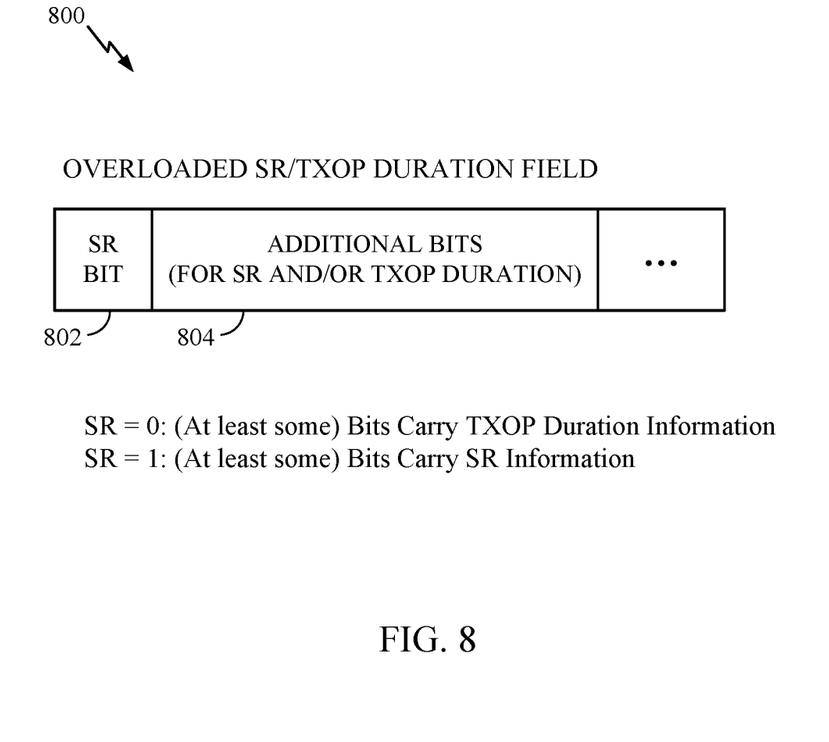
FIG. 8 illustrates an example format of an overloaded subfield, in accordance with certain aspects of the present disclosure.

For example, as illustrated in FIG. 8, an overloaded field 800 may have a single SR bit sub-field 802 that indicates whether remaining bits 804 include SR information, TXOP duration information, or both. For example, at least one bit may indicate a first set of bits of the first field that carry TXOP duration information and may also indicate a second set of bits of the first field that carry a partial association identifier (AID). The SR bit sub-field may be part of the same field including the additional bits or a separate field.

In some cases, such an overloaded field may be included in a header of a frame allowing a receiving device to process TXOP duration information early. TXOP duration information provides an indication of an expected time of a current transaction (e.g., allowing or causing other devices to avoid the medium for that time) In some cases, by putting such information in a physical layer (PHY) header, rather than a media access control (MAC) header, a receiving device may be able to determine this information sooner. This may allow a device to save power by staying awake for a shorter duration (e.g., just long enough to process the PHY header before returning back to sleep).

As illustrated in FIG. 8, in some cases the SR bit may be set to a zero to indicate the remaining bits carry TXOP duration information or may be set to a 1 to indicate the remaining bits carry SR information.

The overloaded sub-field may be any suitable length (e.g., 10 bits in length), but SR information may not require all the bits. In such cases, remaining bits may be used to carry other information. For example, assuming 10 bits, 4 bits may be used for SR information, while remaining 6 bits may be used to carry other information related to the HE frame. This other information may include TXOP Duration with less granularity (than available with 10 bits), such as 100 us or coarser granularity rather than 4 us when 10 bits are used (and a receiver may calculate a TXOP duration based on the indicated or determined granularity). Other types of information may include a partial association identifier (AID) (for Tx or Rx), some other information, or a combination of these.

Figure 9:
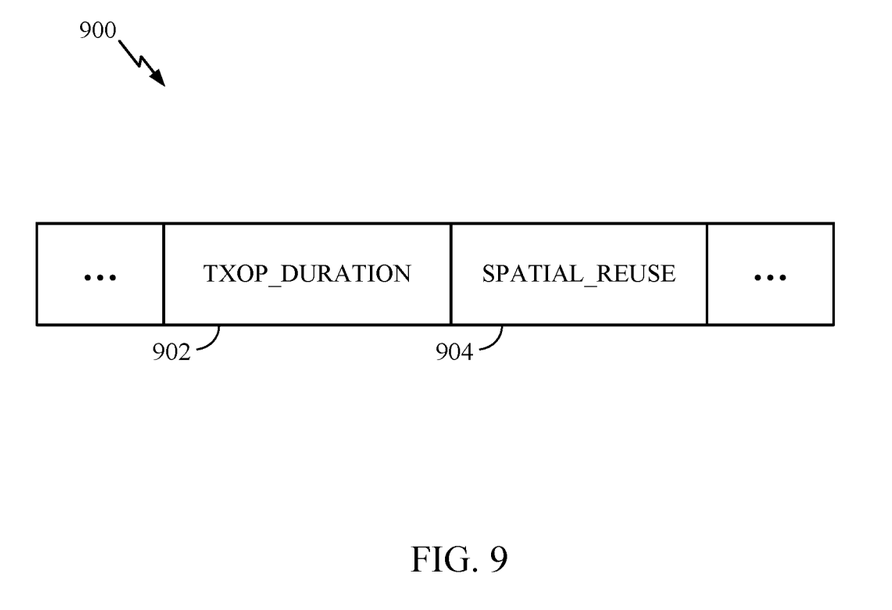
FIG. 9 illustrates an example format of a frame header, in accordance with certain aspects of the present disclosure.

As described above, in some cases, a frame header may include both SR information and TXOP duration information. FIG. 9 illustrates an example of such a header 900 with a first set of bits (e.g., a field/sub-field) 902 for TXOP duration information and a second set of bits 904 for SR information. As noted above, one or more bits in the frame 900 may indicate how to process the TXOP duration information or the SR information (e.g., indicating a granularity of the TXOP duration information).

In either case, a receiving STA can use the TXOP duration information, and the appropriate granularity, to compute a TXOP Duration value for its own UL frame. For example, when receiving a frame that triggers uplink transmissions, a receiving STA may set its TXOP duration value for its UL frame based on the value in the overloaded field of the DL trigger frame.

In some cases, a value may be selected to indicate a receiving device should ignore the value(s) of the TXOP duration or SR field(s). For example, an unspecified/undefined value (e.g., all 1s or all 0s) for TXOP duration may be used to indicate this field does not carry valid TXOP duration information—i.e., this field should be ignored. This may be useful, for example, if an overlapping BSS (OBSS) is detected that uses same BSS "color" bits as the BSS. In such cases, information provided in the header may not be useful for early detection and a receiver may need to process MAC header information (setting the values to an invalid value provide the indication this information should be ignored).

In such cases, a receiving device that is ignoring the field (or otherwise is unable to process this field) may perform deeper packet (frame) inspection to determine the TXOP duration. For example, if the overloaded field is provided in a PHY header, a receiving device may further process the frame to find a TXOP duration provided in a MAC frame. For reasons discussed above, this further/deep inspection may not be a preferred option, however, as it may require the receiving device to say awake longer or spend energy processing the frame.

As noted above, TXOP Duration field values may have different granularities. In some cases, the TXOP Duration field may be encoded using different encoding types (e.g., a linear type, an exponential type, a logarithmic type, etc.). As such, the different types of encoding may represent different granularities. As noted above, a bit in the frame header may indicate the granularity. As an example, a first value of the bit indicates a first granularity (e.g., on the order of µs), while a second value of the bit indicates a second granularity (e.g., on the order of 10 s or hundreds of µs). In some cases, the bit may be one of the bits of TXOP Duration information.

As discussed above, carrying TXOP Duration in the PHY header may let the receiver know (without needing to process the Duration field in the MAC header) the amount of time the medium is expected to be busy. Within a transmitter device the TXOP_DURATION parameter of the TXVECTOR carries the TXOP Duration value. In some cases, an AP can send a trigger frame that can prompt multiple STAs to send uplink (UL) data to the AP. The trigger frame may carry information which can enable multi-STA UL traffic. In some cases, the AP's trigger frame may not carry TXOP Duration in its PHY header. However, it may contain a Duration field in the MAC header.

In such cases, a triggered STA device may be configured to set the TXOP_DURATION parameter of TXVECTOR to the value obtained from the Duration/ID of the Trigger frame minus the time, in microseconds, between the end of the PPDU carrying the Trigger frame and the end of the trigger-based PPDU. When using a TXOP duration field having a coarser granularity, if the calculated value is not a multiple of the granularity (e.g., in microseconds), the value inserted in the TXVECTOR parameter TXOP_DURATION may be rounded up to a next higher integer for overprotection (or rounded down to a next lower value to avoid wasting resources) so that the contained value in the TXOP_DURATION is a multiple of GRANULARITY. In some cases, if the calculated value results in a negative value, the TXVECTOR parameter TXOP_DURATION may be set to 0.

As described herein, aspects of the present, a frame header may include one or both of SR Information and TXOP Duration information. By providing such information in a header, a receiving device may be able to make decisions, such as processing the frame further (e.g., performing deep packet inspection for additional information) or halting processing and enter/resume a low power state (e.g., for a duration indicated by the TXOP Duration information).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for receiving (or means for obtaining) may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting (or means for outputting) may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for processing, means for calculating, means for determining, means for generating, means for setting, and means for taking, and/or means for detecting may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for signaling at least one of whether and how to use SR information.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate a frame with a header comprising at least a first field carrying spatial reuse (SR) information and transmit opportunity (TXOP) duration information, wherein the header further comprises:
      at least one bit that indicates how to process at least one of the SR information or the TXOP duration information; and
      at least one additional bit that indicates a granularity of a value of the TXOP duration information carried in the first field; and
   an interface configured to output the frame for transmission.

2. The apparatus of claim 1, wherein the at least one additional bit comprises at least one bit of the TXOP duration information.

3. The apparatus of claim 1, wherein a granularity of a value of TXOP duration information carried in the first field is based on a type of encoding of the value of the TXOP duration information.

4. The apparatus of claim 1, wherein the processing system is configured to set a value of at least one of the TXOP duration information or the SR information to a value that indicates corresponding information in the header should be ignored.

5. The apparatus of claim 4, wherein the processing system is configured to set the value of the TXOP duration information to a value that is not a valid value to indicate the TXOP duration information in the header should be ignored.

6. The apparatus of claim 1, wherein the TXOP duration information is encoded using a first encoding type.

7. The apparatus of claim 6, wherein the first encoding type represents a granularity of the TXOP duration information.

8. The apparatus of claim 1, wherein the processing system is further configured to generate a trigger frame, triggering multiple wireless stations (STAs) to send uplink (UL) data to the apparatus.

9. The apparatus of claim 8, wherein the trigger frame includes information which enables multi-STA UL traffic.

10. The apparatus of claim 8, wherein:
    the trigger frame does not include TXOP Duration in a physical header of the trigger frame; and
    the trigger frame includes a duration field in a media access control (MAC) header of the trigger frame.

11. An apparatus for wireless communications, comprising:
    a first interface configured to obtain a first frame with a header comprising at least spatial reuse (SR) information and transmit opportunity (TXOP) duration information, wherein the header further comprises:
       at least one bit that indicates how to process at least one of the SR information or the TXOP duration information; and
       at least one additional bit that indicates a granularity of a value of the TXOP duration information carried in the header; and
    a processing system configured to take one or more actions based on at least one of the SR information or the TXOP duration information.

12. The apparatus of claim 11, wherein:
    the processing system is further configured to determine the first frame was transmitted from an overlapping basic service set (OBSS) network;
    the one or more actions comprise deciding the apparatus is permitted to output a second frame for transmission during a TXOP duration of the first frame, based on the SR information, and generating the second frame; and
    the apparatus further comprises a second interface configured to output the second frame for transmission.

13. The apparatus of claim 12, wherein:
    the SR information indicates under what one or more conditions the apparatus is permitted to output the second frame for transmission during the TXOP duration of the first frame; and
    the processing system is configured to generate the second frame only if the conditions are met.

14. The apparatus of claim 11, wherein the processing system is further configured to determine how to process at least one of the SR information or the TXOP duration information based on the at least one bit in the header.

15. The apparatus of claim 11, wherein:
    the processing system is configured to determine, based on the at least one additional bit in the header, the granularity of the value of TXOP duration information carried in the header and to calculate a TXOP duration based on the TXOP duration information and the determined granularity; and
    the one or more actions comprise causing the apparatus to avoid outputting frames for transmission for the calculated TXOP duration.

16. The apparatus of claim 15, wherein the at least one additional bit comprises at least one bit of the TXOP duration information.

17. The apparatus of claim 11, wherein the one or more actions comprise at least one of:
- ignoring the TXOP duration information in the header if the TXOP duration information in the header is set to a value that indicates the TXOP duration information in the header should be ignored and processing a remaining portion of the first frame to obtain additional TXOP duration information; or
- ignoring the SR information in the header if the SR information in the header is set to a value that indicates the SR information in the header should be ignored and processing a remaining portion of the first frame to obtain additional SR information.

18. The apparatus of claim 11, further comprising at least one antenna, wherein the first interface is configured to obtain the first frame via the at least one antenna and the apparatus is configured as a wireless station.

19. A wireless station, comprising:
- a processing system configured to generate a frame with a header comprising at least a first field carrying spatial reuse (SR) information and transmit opportunity (TXOP) duration information, wherein the header further comprises:
  - at least one bit that indicates how to process at least one of the SR information or the TXOP duration information; and
  - at least one additional bit that indicates a granularity of a value of the TXOP duration information carried in the first field; and
- a transmitter configured to transmit the frame.

* * * * *